US006833017B2

(12) United States Patent
Quigley

(10) Patent No.: US 6,833,017 B2
(45) Date of Patent: Dec. 21, 2004

(54) FILTER ASSEMBLY AND METHOD WITH POLYIMIDE

(75) Inventor: John Patrick Quigley, Watertown, WI (US)

(73) Assignee: SPX Corporation, Charlotte, NC (US)

( * ) Notice: Subject to any disclaimer, the term of this patent is extended or adjusted under 35 U.S.C. 154(b) by 46 days.

(21) Appl. No.: 10/133,327

(22) Filed: Apr. 29, 2002

(65) Prior Publication Data

US 2003/0029146 A1 Feb. 13, 2003

Related U.S. Application Data

(60) Provisional application No. 60/311,097, filed on Aug. 10, 2001.

(51) Int. Cl.[7] ............................ B01D 46/10; B01D 46/52
(52) U.S. Cl. ............................ 55/497; 55/500; 55/502; 55/521; 55/DIG. 5; 55/DIG. 31; 156/330.9; 156/331.1; 156/331.4; 156/331.7

(58) Field of Search .................... 55/495, 497, 500, 55/502, 521, DIG. 5, DIG. 31; 156/327, 330.9, 331.1, 331.4, 331.7

(56) References Cited

U.S. PATENT DOCUMENTS

| | | | | |
|---|---|---|---|---|
| 4,107,153 A | * | 8/1978 | Akiyama et al. | 528/322 |
| 5,224,974 A | * | 7/1993 | Johnson | 55/502 |
| 5,346,982 A | * | 9/1994 | Tamai et al. | 528/183 |
| 5,766,288 A | * | 6/1998 | Thiele et al. | 55/486 |
| 5,983,363 A | * | 11/1999 | Tuttle et al. | 714/25 |
| 6,027,553 A | * | 2/2000 | Hirano et al. | 55/502 |
| 6,156,090 A | * | 12/2000 | Ishikawa et al. | 55/471 |
| 6,307,008 B1 | * | 10/2001 | Lee et al. | 528/353 |
| 6,406,509 B1 | * | 6/2002 | Duffy | 55/497 |
| 6,479,431 B1 | * | 11/2002 | McFall et al. | 156/60 |

* cited by examiner

*Primary Examiner*—Duane Smith
*Assistant Examiner*—Jason M. Greene
(74) *Attorney, Agent, or Firm*—Baker & Hostetler LLP

(57) ABSTRACT

A filter assembly and method includes a filter media attached to a perimeter frame using a polyimide material.

22 Claims, 3 Drawing Sheets

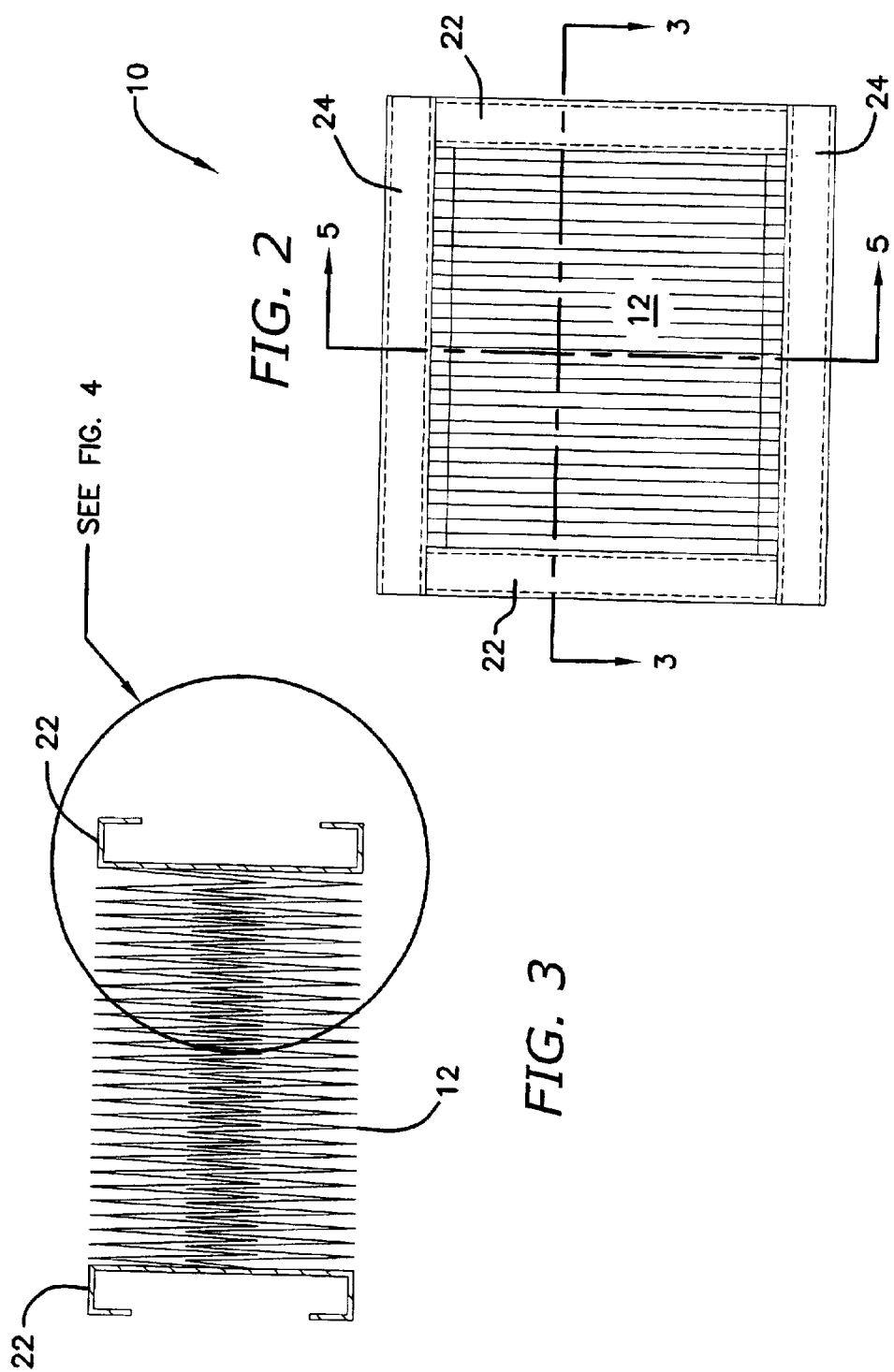

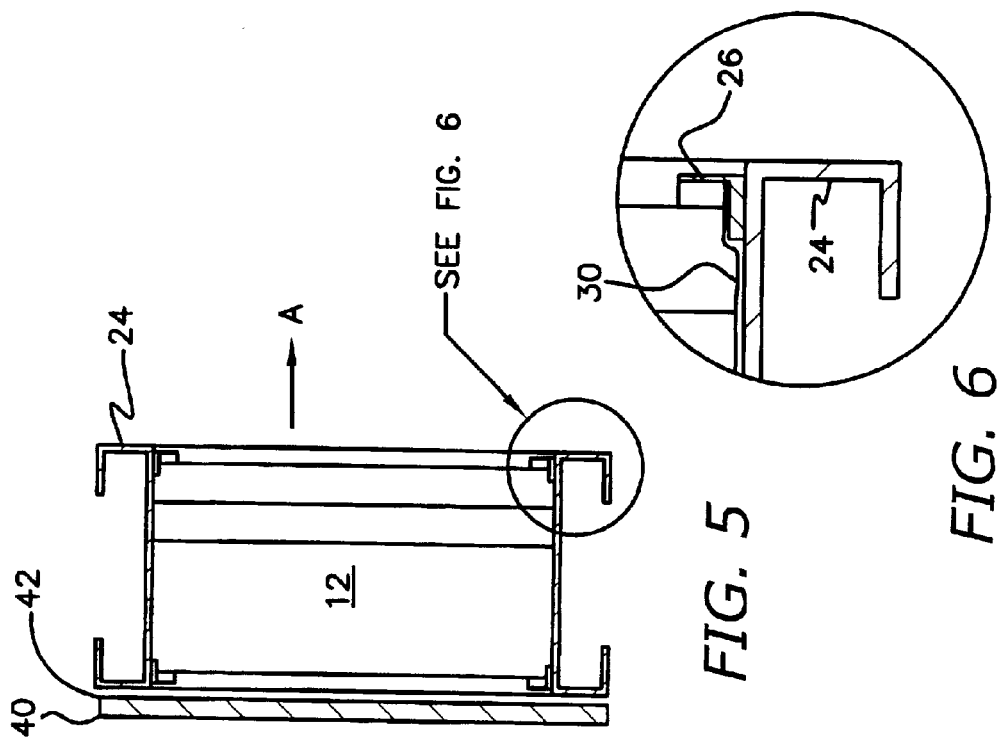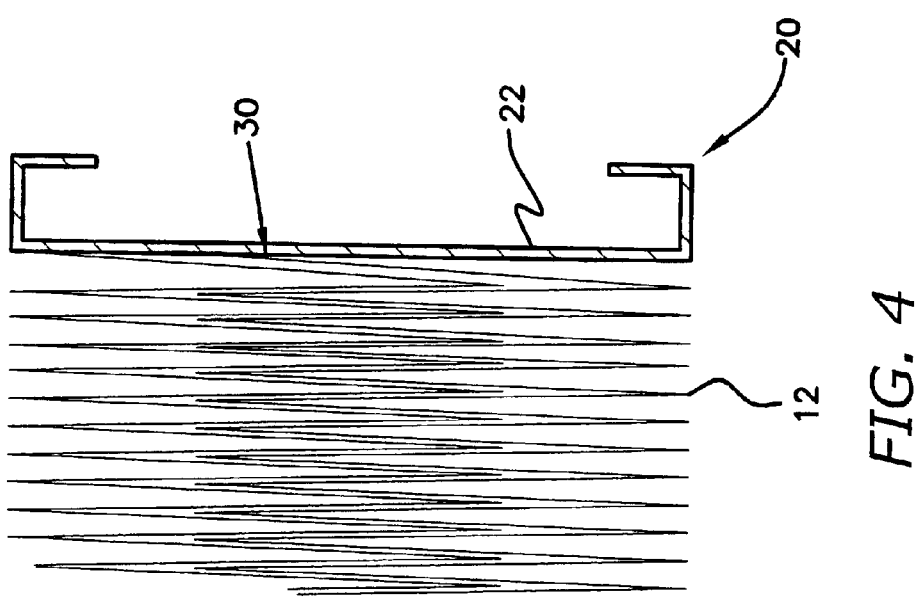

FILTER ASSEMBLY AND METHOD WITH POLYIMIDE

RELATED APPLICATIONS

This application claims priority to provisional patent application 60/311,097, entitled High Temperature Filter Assembly, filed on Aug. 10, 2001, the disclosure of which is hereby incorporated herein by reference.

FIELD OF THE INVENTION

The invention pertains to filter assemblies. More particularly, the invention relates to air filter assemblies that may be used in industrial ovens, including for example relatively high temperature ovens.

BACKGROUND OF THE INVENTION

Some applications for air filters are in the field of industrial ovens. These ovens can be broadly classified as relatively low temperature ovens, that operate up to 250° C., and so-called high temperature ovens, which generally operate above 250° C. up to 500° C.

It is often desirable to operate these ovens in a clean room environment. In such environments, the ovens are often desired to have HEPA (high efficiency particulate air) filters or ULPA (ultra low particulate air—a higher cleanliness level than HEPA) filters. Conventional HEPA or ULPA filters generally have a pleated woven filter media that has a generally accordian structure and is supported by a perimeter steel frame. The pleated filter material is generally bonded at its edges to the steel frame by a silicone material. The silicone serves as a bonding agent to attach the pleated filter media to the steel frame at the edges of the media, and also serves as a sealing agent to prevent leakage at the attachment of the filter media to the frame.

A disadvantage of such filter assemblies using silicone is that in typical applications the silicone can generally only be rated to have sufficient useful surface life up to 250° C. Thus, although the pleated filter media and the steel frame could survive temperatures in excess of 500° C., these filters are limited to use only up to 250° C. due to the limitation imposed by the silicone bonding and sealing structures.

Thus, there is a need in the art for air filters that can operate at greater than 250° C. One solution to this problem has been to use a ceramic adhesive instead of the silicone. However, filters using ceramic suffer the disadvantages that the ceramic is brittle and sometimes cracks, and that the ceramic sheds particles, which is not suitable in a clean environment. Another approach has been to design the oven to have a continuous cooling feature where the air inside the oven is cooled before passing through the filter. The air is then reheated back to operating temperature before passing through the product workspace. This solution takes advantage of having a high cleanliness silicone type filter assembly, but requires additional complexity in the oven design in order to accomplish the cooling and reheating of the air, and also leads to further complexity getting desired temperature uniformity in the workspace.

Accordingly, it will be appreciated that there is a need in the art for a filter than can take advantage of the desirable properties of attending filter media to a rigid frame, and that can in some embodiments provide the ability to operate at relatively high temperatures.

SUMMARY OF THE INVENTION

The invention provides filter assemblies that overcome the above difficulties at least to some degree, and is capable of providing filters using filter material within a rigid perimeter frame capable in some embodiments of operating at relatively high temperatures.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a front view of a filter assembly according to FIG. 1.

FIG. 3 is a cross-sectional view of the filter assembly of FIG. 2 taken through line 3—3 in FIG. 2.

FIG. 4 is a detailed view of an end of the cross-section of FIG. 3.

FIG. 5 is cross-sectional view of the filter of FIG. 2, taken through line 5—5 in FIG. 2, and illustrating an alternative embodiment having a gasket.

FIG. 6 is a detailed cross-sectional view of the indicated portion of FIG. 5.

DETAILED DESCRIPTION OF PREFERRED EMBODIMENTS OF THE INVENTION

Figure 1:
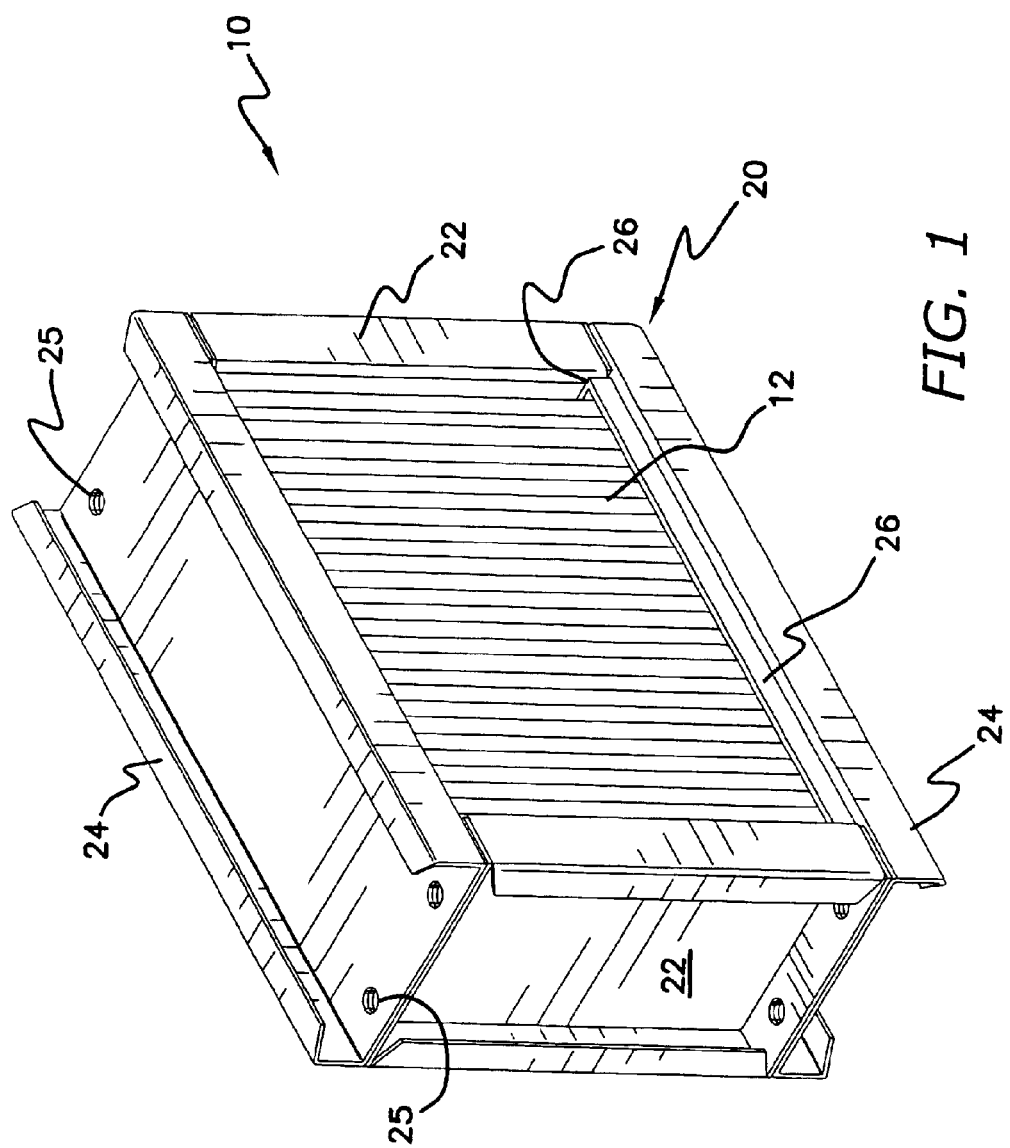
FIG. 1 is a perspective view of a filter assembly according to one preferred embodiment of the invention.

The invention provides filter assemblies using filter material within a rigid perimeter frame capable in some embodiments of operating at relatively high temperature, for example, above 250° C.

A preferred embodiment of the invention illustrated in FIGS. 1–6 generally includes a filter assembly having a rigid perimeter frame surrounding a filter material, which in the illustrated embodiment is a pleated filter material. The filter material is bonded around its periphery to the inner surfaces of the frame using a polyimide material. The polyimide material serves both to structurally attach the edges of the filter to the frame, and also serves as a sealing material to seal air flow so that it does not leak around the edges of the filter media between the edges of the media and the frame.

Turning now more specifically to FIGS. 1–6, the filter assembly 10 includes a pleated filter material 12. The pleated filter material 12 can be of the conventional type used in HEPA or ULPA filters. This material, which is commercially available, is typically a pleated woven fiberglass material having a generally accordian cross-sectional shape as seen particularly in FIGS. 3 and 4.

The filter media 12 is surrounded by, and bonded to, a perimeter frame 20. The perimeter frame 20 in the preferred embodiment is constructed from sheet steel, which has desirable heat resistant properties and provides easy manufacturability. However, in other embodiments the frame 20 may be made of other materials, such as other metals or alloys, or may even be made of other suitably rigid non-metallic materials depending on the application.

The frame 20 in the preferred embodiment has two side rails 22 and two end rails 24. As seen in FIG. 3, the side rails 22 are each an elongated C-shaped channel structure, to provide desirable rigidity. The end rails 24, as seen particularly in FIG. 5, are also elongated C-shaped channels.

As seen in FIGS. 1 and 2, the side rails 22 are attached at their ends to the end rails 24, which may be accomplished by any suitable fastening or attaching device. In the preferred embodiment, fasteners such as bolts can be placed through the holes 25 illustrated in FIG. 1. Alternatively, the side rails 22 may be joined to the end rails 24 by welding or rivets.

As seen particulary in FIGS. 4 and 6, the filter media 12 is bonded at its periphery to the inner surfaces of the frame 20 by a layer of polyimide 30. Because the edges of the filter media 12 are different at the side rails 22 as compared to the end rails 24, the application and arrangement of the polyimide 30 is different on the side rails 22 versus the end rails 24. FIG. 4 illustrates that at the side rails 22 a single elongated edge of the pleated filter material 12 is bonded to the side rail 22. In some embodiments, this is accomplished by a single elongated strip type layer of polyimide 30 that can simply be painted on the inside of the side rail 22 with a brush. Because the outermost edge of the media 12 at the side rails 22 provides a single flat elongated attachment surface, the polyimide 30 in this area can be easily applied and the bonding and sealing readily accomplished. Alternatively, the side rails 22 can be constructed to have angle iron to form a well similar to the angle irons on the end rails 24 (described in more detail below) to contain a desired thickness of polyimide.

As seen in FIGS. 1, 5 and 6, at the end rails 24 a zig-zagging end of the pleated filter material needs to be bonded perpendicularly to the end rail 24. To accomplish this, the polyimide is applied to the inner surface of the end rail 24 across a width of the side rail 24 that is at least as wide as the zigzagging width of the filter material 12. For this purpose, it is desirable to have a relatively thick and wide covering of polyimide 30 across the end rail 24 at a width greater than the filter material 12. In the preferred embodiment, as illustrated particularly in FIG. 6, an L-shaped angle bar 26 is mounted on the inner surface near both sides and both ends of the end rail 24, and extends upwardly as shown. The angle bar 26 together with the inner surface of the end rail 24, provide essentially a square well or container into which polyimide 30 may be applied, and serves to allow the polyimide to be applied at a desired thickness, without the polyimide 30 rolling down over the sides or end of the end rail 24. The four sections of angle bar 26 may be attached to the end rail 24 by any suitable means, such as by welding. The angle bar 26 sections thus provide an upturned wall that cooperates with the inner edge of the end rail 24 to provide a well for the polyimide 30.

FIG. 5 illustrates the filter 10 being used in conjunction with a gasket 40. This gasket 40 is a peripheral square ring that rests along the front surface of the frame 20 and seals the front surface of the frame 20 to an oven or air plenum or other air flow apparatus. In some embodiments, this gasket 40 may also be made of polyimide.

The polyimide 30 in the filter assembly, as mentioned above, can provide both the functions of (1) structurally attaching the media 12 to the frame 20, and (2) providing an air tight seal of the filter media 12 around its periphery to the inside of the frame 20. This can provide the benefit that all or substantially all of the air flow is directed through the filter media 12 in order to provide a desirable degree of filtration. In the preferred embodiment, the sealing material 30 is a suitable polyimide material. A preferred polyimide is commercially available and is known as HD Microsystems formulation PI-5878G. While this is the preferred commercially available polyimide, other polyimide materials may be used in accordance with the present invention.

In a preferred embodiment of the method of assembly of the filter, the side rails 22 and end rails 24 are bolted together at the attachment points 25. The frame 20 is preferably manufactured of stainless steel which is passivated, acid free, cleaned and dried prior to use, to avoid dilaterious effects with moisture on the polyimide. The frame 20 is checked for squareness and flatness so that it will fit with the periphery material within appropriate tolerances.

The assembly process is carried out by first bolting two of the side rails 22 to one of the end rails 24. Polyimide 30 is dispensed into the well formed by angle bars 26 on the first end rails 24, and is painted thickly onto the two ends. Next, the filter media is inserted so that it makes full contact on its three sides with the end rail 24 and the two side rails 22. These three contact edges are then cured as described in more detail below. Next, the second side rail 24 is oriented horizontally and polyimide 30 is dispensed into the well of the second end rail 24, and the frame assembly, now oriented upside down compared to its original orientation, is lowered onto the second end rail 24. The second end rail 24 is bolted to the assembly, and then the second end rail 24 is cured in a fashion similar to the curing of the first three regions. Now, the filter assembly 10 is fully constructed, and a gasket 40 may be attached as appropriate. In some instances, an additional curing step may be desirable.

The invention can be constructed in a wide range of sizes. Examples of some size considerations applied in some embodiment are given below. However, these dimensional considerations are examples and do not limit the possible sizes that can be used with the invention.

In one embodiment, about 95% of the polyimide required to seal the filter is consumed in making the seal to the end rails 24. The polyimide applied here should be accurately dispensed into the well formed by the angle bars 26. In one embodiment, by way of example only, the angle bars 26 are approximately 5/16" (0.312") high. The inside width (W) and depth (D) of the well varies depending on the size filter being assembled. To calculate the amount of polyimide to dispense in each end, it is possible to find the volume of polyimide in cubic inches, then convert to mililiters (or ccs). The thickness of the dispense for the end rails 24 can be kept constant for many sizes of filter. Experience has proven that a desirable dispense thickness for the end rails 24 is 3/16". This may be increased to 0.25". By way of example, to calculate the volume of the dispense for ends:

Let $t1$=thickness of dispense (0.1875" usually)

$W$=inside width of well in end frame (the major dimension)

$D$=depth of well in end frame (the minor dimension)

SG=specific gravity of polyimide (assumed to be 1.0 at present)

Volume=SG*W*D*t1 (cubic inches)

Conversion from cubic inches to mililiters (cc)

1 cubic inch=16.387 ml

The polyimide for the sides is best applied using a paintbrush. In general, only about 5% of the total polyimide consumed is used on the sides. To obtain accuracy when desired is a method of calculation is as follows. The thickness of the dispense for the side rails 22 should be constant for any size filter. This thickness is assumed at present to be 1/64" when applied with a paintbrush.

Calculating volume of dispense for sides:

Let t2=thickness of dispense (0.16)

W=width of well in end frame

H=height of side frame in contact with media

SG=specific gravity of polyimide (assumed to be 1.0 at present)

Volume=SG*W*H*t2

Conversion from cubic inches to mililiters (cc)

1 cubic inch=16.387 ml

The total volume of solution required from a single filter is equal to:

Volume=2*(SG*W*H*t2)=2*(SG*W*D*t1)

Polyimide has a tendency to crack and delaminate after curing when the dispensed thickness is too great. Fortunately, this can be controlled if wettable surfaces are always kept in close proximity. If polyimide is dispensed directly onto stainless steel and cured, the dispensed thickness can be up to 0.031" and coat a surface up to 2 inches across without cracking or requiring additional wetted surfaces. When polyimide is in contact with wettable surfaces no more than 3/16" away, the dispense thickness can be as much as 3/16" thick without risk of cracking.

Prior to polyimide application, the substrate may be primed with an adhesion promoter such as VM-651/652, to enhance the adhesion of PI-5878G to oxides and most metals. The adhesion promoter is activated during the softbake process cycle. The VM-651 product is sold as a concentrate. This adhesion promoter is typically mixed as a 0.1% solution in deionized water and discarded after a 24-hour period. Usage of adhesion promoter may not in some circumstances offer any advantage or even be necessary for assembly of the filter. However, due to the risk of seal separation after curing, adhesion promoter can still be used to minimize this effect. The media wicks a large amount of polyimide up into it. When the seal is made to stainless, it has shown to date to be a very tough and resilient seal.

The polyimide is too viscous to flow through small cracks. Thus, spot welding is an adequate method to join two pieces of metal to form a barrier that polyimide will not flow through during dispense or cure. Polyimide has been seen to bridge an open gap between two pieces of metal such as 1/32" and create a wetted seal between the two pieces.

After application of the polyimide, a soft bake process is required. The primary objectives are to drive off carrier solvents from the polyimide coating and produce a tack-free surface for intermediary processing. Coated substrates can be soft baked on one or more hotplates or in a vented convection oven.

The substrates should remain in a horizontal (level) position during the soft bake process since the coating is still liquid after dispensing and not prone to air-drying. Coated substrates should be cooled to ambient temperature prior to any further application of polyimide or other handling. Once soft baked, the coated substrates can be stored for up to 24 hours under clean room conditions prior subsequent processing.

Soft cures can be done with final cure immediately following in the same profile. The cycle time for assembling a filter may be reduced by using a shorter soft bake, followed by a subsequent dispense and soft bakes. Once all soft bakes are completed, the entire filter can be final cured, thus saving time.

The cure heating cycle drives out the remaining carrier solvent and converts the polyimide precursor (or polyamic acid) into an insoluble polyimide film. This process requires elevated temperatures and controlled environments to achieve the best results. As the process continues, water is released as a by-product of the imidization reaction. There is sufficient thermal energy at 250° C. to complete about 90% of the imidization, but higher temperatures can completely drive off the carrier solvents and complete the imidization process, thereby achieving optimum mechanical and dielectric properties. Final curing is usually done between 350–375° C., although both lower and higher cure temperatures can be used.

The final cure is preferably carried out in an inert atmosphere. Nitrogen or forming gas may be used. A programmable high temperature oven or furnace is preferred with a flow rate of about 10 liters per minute. Air may be used as the curing atmosphere up to 200° C. Above this temperature, an inert atmosphere should be used. Curing ramp rates (up and down) can impact the stress level in cured films. Generally, lower ramp rates result in lower stress, however, stress level is usually not an area of concern for most PI-5878G applications.

A typical oven profile is outlined below. Curing may be done in a furnace or oven using the following cure profile:

Load parts

Heat from room temperature to 200° C., ramp rate: 4° C./minute in air or nitrogen Hold time at 200° C. for 30 minutes in air or nitrogen Heating from 200° C. to 350° C., ramp rate: 2–5° C./minute in nitrogen Hold time at 350° C. for 60 minutes in nitrogen Cool down to <90 . . . C, ramp rate: <5 . . . C/minute A purge schedule follows. Up to 250° C. polyimide may be cured in air, but the 350° C. bake should preferably have an inert atmoshphere, such as nitrogen.

Oven Profile/program:

1. soak at 20C for 15 minutes, N2 purge@>400 scfh
2. ramp to 85C @4C/min., N2 run @60 schfh
3. soak at 85C for 120 minutes, N2 run @60 scfh
4. ramp to 150C @4C/min., N2 run @60 scfh
5. soak at 150C for 60 minutes, N2 run @60 schfh
6. ramp to 200C @4C/min., N2 run @60 scfh
7. soak at 200C for 60 minutes, N2 run @60 schfh
8. ramp to 250C @4C/min., N2 run @60 scfh
9. soak at 250C for 30 minutes, N2 run @60 schfh
10. ramp to 350C @4C/min., N2 run @60 scfh
11. soak at 350C for 120 minutes, N2 run @60 schfh
12. ramp to 20C @-4C/min., N2 purge@>400 scfh
13. soak at 20C for 1 minute, N2 purge@400 scfh Additional details relating to the handling of polyimide and the assembly of a preferred embodiment of the invention can be found in the provisional patent application serial No. 60/311,097 entitled High Temperature Filter Assembly filed on Aug. 10, 2001, in the name of the inventor of the present application, the disclosure of which provisional patent application is hereby incorporated by reference.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A filter assembly, comprising:

a filter media having a periphery;

a frame surrounding at least portion of the periphery of said filter media, and a polyimide material that substantially seals at least a portion of said filter media to said frame, wherein said polyimide material further comprises a first portion applied and cured before a second portion is applied and cured.

2. A filter assembly according to claim 1, wherein said frame surrounds the entire periphery of said filter media.

3. A filter assembly according to claim 2, wherein said polyimide attaches said filter media to said frame around the entire periphery of said filter media.

4. A filter assembly according to claim 1, wherein said filter media is a pleated filter material.

5. A filter assembly according to claim 1, wherein said filter media is a HEPA filter media.

6. A filter assembly according to claim 1, wherein said filter media is a ULPA filter material.

7. A filter assembly according to claim 1, wherein said frame is a rectangular frame having two side rails and two end rails.

8. A filter assembly according to claim 7, wherein said end rails each have upturned bars that form a well that contains a portion of said polyimide that is disposed along the respective said side rail.

9. A filter assembly, comprising:

a filter media having a periphery;

supporting means surrounding at least a portion of the periphery of said filter media for supporting the filter media; and sealing means having polyimide for substantially sealing at least a portion of said filter media to said supporting means, wherein said sealing means further comprises a first portion applied and cured before a second portion is applied and cured.

10. A filter assembly according to claim 9, wherein said supporting means surrounds the entire periphery of the filter media.

11. A filter assembly according to claim 10, wherein said attaching means attaches the filter media to said supporting means around the entire periphery of the filter media.

12. A filter assembly according to claim 9, wherein said filter media is a pleated filter material.

13. A filter assembly according to claim 9, wherein said filter media is HEPA filter media.

14. A filter assembly according to claim 9, wherein said filter media is ULPA filter material.

15. A filter assembly according to claim 9, wherein said supporting means is a rectangular frame having two side rails and two end rails.

16. A filter assembly according to claim 15, wherein said side rails have containing means for containing a portion of the polyimide that is disposed along the respective said side rail.

17. A method for assembling a filter assembly, comprising the steps of:

providing a frame;

providing a filter media; and attaching the filter media to the frame using polyimide, wherein the attaching step comprises a first step of applying and curing a first portion of the polyimide, and second step of applying and curing a second portion of the polyimide.

18. A method according to claim 17, wherein the attaching step further comprises applying the polyimide to the frame, and curing the polyimide.

19. A method according to claim 17, when the attaching step further comprises containing a portion of the polyimide on a portion of the frame in a well.

20. The filter assembly of claim 1, wherein at least part of the frame is stainless steel.

21. The filter assembly of claim 9, wherein at least part of the supporting means is stainless steel.

22. The method of claim 17, further comprising applying the polyimide at least in part with a brush.

* * * * *